(12) United States Patent
Thompson et al.

(10) Patent No.: US 9,159,357 B2
(45) Date of Patent: Oct. 13, 2015

(54) EFFICIENT MOVES VIA REPOSITORY

(71) Applicants: Nathan Christopher Thompson, Boulder, CO (US); Matthew Thomas Starr, Lafayette, CO (US)

(72) Inventors: Nathan Christopher Thompson, Boulder, CO (US); Matthew Thomas Starr, Lafayette, CO (US)

(73) Assignee: Spectra Logic Corporation, Boulder, CO (US)

(*) Notice: Subject to any disclaimer, the term of this patent is extended or adjusted under 35 U.S.C. 154(b) by 0 days.

(21) Appl. No.: 13/966,393

(22) Filed: Aug. 14, 2013

(65) Prior Publication Data

US 2015/0050106 A1 Feb. 19, 2015

(51) Int. Cl.
*G11B 17/00* (2006.01)
*G11B 15/68* (2006.01)

(52) U.S. Cl.
CPC .......... *G11B 15/689* (2013.01); *G11B 15/6835* (2013.01); *G11B 15/6805* (2013.01); *G11B 15/6895* (2013.01)

(58) Field of Classification Search
None
See application file for complete search history.

(56) References Cited

U.S. PATENT DOCUMENTS

| | | | |
|---|---|---|---|
| 4,386,382 A | 5/1983 | Cutler et al. | |
| 4,961,123 A * | 10/1990 | Williams et al. | 360/131 |
| 5,128,912 A | 7/1992 | Hug et al. | |
| 5,157,564 A | 10/1992 | Theobald et al. | |
| 5,235,474 A | 8/1993 | Searle | |
| 5,442,500 A | 8/1995 | Hidano et al. | |
| 5,521,586 A | 5/1996 | Takashita | |
| 5,526,217 A | 6/1996 | Gormley et al. | |
| 5,684,654 A | 11/1997 | Searle et al. | |
| 5,738,537 A | 4/1998 | Setoguchi et al. | |
| 5,768,047 A | 6/1998 | Ulrich et al. | |
| 5,818,723 A | 10/1998 | Dimitri | |
| 5,867,344 A | 2/1999 | Ellis et al. | |
| 5,940,355 A | 8/1999 | Buckland et al. | |
| 5,995,320 A | 11/1999 | Ostwald | |
| 6,034,928 A | 3/2000 | Inoue | |
| 6,215,611 B1 | 4/2001 | Gibbons | |
| 6,266,574 B1 | 7/2001 | Searle et al. | |
| 6,324,608 B1 | 11/2001 | Papa et al. | |
| 6,411,462 B1 | 6/2002 | Ostwald et al. | |
| 6,512,962 B2 | 1/2003 | Dimitri et al. | |
| 6,600,703 B1 | 7/2003 | Emberty et al. | |
| 6,639,751 B2 | 10/2003 | Brace et al. | |
| 6,650,961 B2 | 11/2003 | Deckers | |
| 6,661,602 B2 | 12/2003 | Benson et al. | |
| 6,704,832 B1 | 3/2004 | Ng | |
| 6,782,448 B2 | 8/2004 | Goodman et al. | |
| 6,796,813 B1 | 9/2004 | L'Hermet | |
| 6,813,113 B1 | 11/2004 | Mueller et al. | |
| 6,845,422 B2 | 1/2005 | Shimada et al. | |
| 6,859,854 B2 | 2/2005 | Kwong | |
| 6,880,033 B1 | 4/2005 | Mahmoud et al. | |
| 6,922,307 B2 | 7/2005 | Ostwald et al. | |
| 6,957,291 B2 | 10/2005 | Moon et al. | |
| 7,028,314 B2 | 4/2006 | Coffin et al. | |
| 7,039,924 B2 | 5/2006 | Goodman et al. | |
| 7,046,586 B1 * | 5/2006 | Creager et al. | 369/30.28 |
| 7,676,817 B1 * | 3/2010 | Leonhardt et al. | 720/615 |
| 2003/0040836 A1 | 2/2003 | Deckers | |
| 2003/0063527 A1 | 4/2003 | Ostwald | |
| 2004/0181388 A1 | 9/2004 | Yip et al. | |
| 2010/0114361 A1 * | 5/2010 | Starr et al. | 700/214 |

* cited by examiner

*Primary Examiner* — Andrew L Sniezek
(74) *Attorney, Agent, or Firm* — Kenneth Altshuler

(57) ABSTRACT

A storage library is described that includes a shelf system adapted to support a number of tape cartridges. The storage library further includes a tape drive adapted to read and write data to and from tape cartridges. The storage library further possesses a temporary repository near the tape drive that is adapted to facilitate an exchange of a first tape cartridge intended to be loaded in the tape drive with a second tape cartridge ready to be removed from the tape drive with a single tape picker device.

20 Claims, 7 Drawing Sheets

EFFICIENT MOVES VIA REPOSITORY

CROSS-REFERENCE TO RELATED APPLICATIONS

This application is a divisional which claims priority to and the benefit of U.S. patent application Ser. No. 12/951,144 entitled Efficient Moves via Repository, filed Nov. 22, 2010, the entire disclosure of which is hereby incorporated by reference.

BACKGROUND OF THE INVENTION

1. Field of the Invention

The present embodiments are directed to a data cartridge library that is useful in storing data on a recording medium located in a cartridge and/or retrieving data from such a recording medium.

2. Description of Related Art

Presently, data cartridge libraries transfer tape cartridges between a shelf system and a tape drive. If access to a target tape cartridge is required, for reading and/or writing data, the target tape cartridge is moved from a shelf system to the target tape drive where it is loaded therein. Following any access requirement, the tape cartridge is returned to the shelf system before a different tape cartridge is accessed. These basic operations are essentially repeated each and every time a new tape cartridge is accessed.

It is to innovations related to this subject matter that the claimed invention is generally directed.

SUMMARY OF THE INVENTION

The present embodiments generally relate to a cartridge-based library that reduces the number of robotic motion steps between a shelf system and drive by incorporating a transitional repository that temporarily holds cartridges near the drive. Some embodiments of the present invention contemplate a data storage library comprising: a first and second portable data storage cartridge; a shelf system adapted to support the first and the second portable data storage cartridges; a data transfer device, structured and arranged to read and write data from and to either of the portable data storage cartridges when a cooperating relationship is formed therewith; and a repository adapted to temporarily hold the first portable data storage cartridge until after the second portable data storage cartridge is introduced to the data transfer device, the repository adapted to hold the first portable data storage cartridge prior to being returned to the shelf system.

Other embodiments of the present invention can therefore comprise a method storage library arranged to perform a method comprising: receiving an unload request from a host computer to unload a first data storage cartridge from a cartridge data transfer device and return the first data storage cartridge to a designated location in a shelf system; responding to the host computer that the unload request and the return request are complete, even though the unload request and the return request have not been physically carried out; receiving a load request from the host computer to load a second data storage cartridge in the cartridge data transfer device; transporting the second data storage cartridge from the shelf system to a repository near the cartridge data transfer device and disposing the second data storage cartridge in the repository; removing the first data storage cartridge from the cartridge data transfer device and disposing the first data storage cartridge in the repository; removing the second data storage cartridge from the repository; loading the second data storage cartridge in the cartridge data transfer device; and removing the first data storage cartridge from the repository and transporting the first data storage cartridge back to the shelf system.

Yet other embodiments of the present invention can therefore comprise a method storage library arranged to perform a method comprising: unloading a first storage cartridge from a cartridge data transfer device; disposing the first storage cartridge in a transitional repository located in close proximity to the cartridge data transfer device; loading a second storage cartridge in the cartridge data transfer device from the transitional repository after the disposing step; and moving the first storage cartridge to a shelf system from the transitional repository.

And, yet other embodiments of the present invention can therefore comprise a library storage system comprising a means for replacing a first tape cartridge relating with a tape drive with a second tape cartridge using a robotic transporter and picker device that essentially makes a first move carrying the second tape cartridge from a shelf system to deliver to the tape drive and a second move returning the first tape cartridge to the shelf system from being used with the tape drive, the first move occurs before the second move.

And, yet other embodiments of the present invention can therefore comprise a library storage system adapted to replace a first storage cartridge relating with a cartridge data transfer device with a second storage cartridge using a robotic transporter that essentially makes a first move carrying the second storage cartridge from a shelf system to deliver to the cartridge data transfer device and a second move, using the robotic transporter, returning the first storage cartridge to the shelf system from being used with the cartridge data transfer device, the first move occurs before the second move.

DETAILED DESCRIPTION

Figure 1:
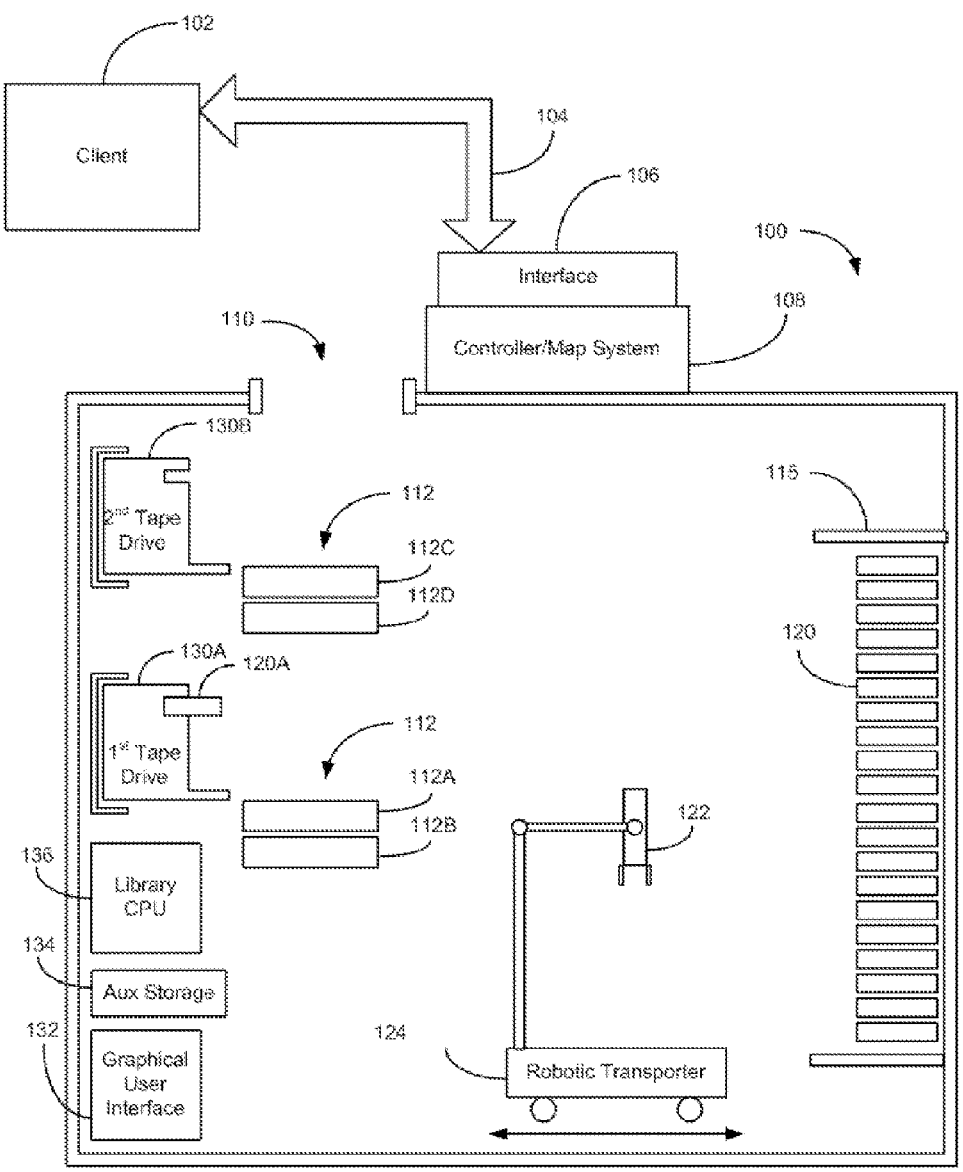
FIG. 1 is an illustration of a data storage arrangement constructed in accordance with certain embodiments of the present invention.

Referring to the drawings in general, and more specifically to FIG. 1, shown therein is an illustration of a data storage arrangement constructed in accordance with various embodiments of the present invention. In what follows, similar or identical structures may be identified using identical callouts.

The data storage arrangement illustrated in FIG. 1 can comprise a user of data 102, such as a client or host computer system, in communication with a data storage library 100. As illustratively shown, the client 102 is in communication with the library 100 via a communication path 104 and the library interface device 106. The library 100 comprises a plurality of tape cartridges 120 disposed in a shelf system 115. A tape cartridge 120 is one embodiment of a portable data storage cartridge, which can include other cartridge devices such as portable solid state devices, conventional magnetic disk drives adapted for portability, such as in a cartridge, and other storage elements packaged accordingly, which are distinguishable over storage elements such as stand-alone disks. Herein, tape cartridges 120 will be used to denote a generic cartridge. The shelf system 115 contains a plurality of slots (not shown) wherein each slot is adapted to accommodate a tape cartridge 120. Here, the library 100 may be configured to maintain a map of the slots in the shelf system 115. More specifically, each slot has a unique identification, such as an address, that can be mapped by a map system 108. A tape cartridge 120 disposed in a particular slot may assume the identity of the particular slot for purposes of the mapping system. Hence, a tape cartridge 120 disposed in a third slot whose address is mapped as slot number three may be made to assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.).

The library 100 can further comprise at least one robotic transporter 124, though in optional library embodiments, multiple transporters can exist. The robotic transporter 124 comprises a carriage or other means for transporting a tape cartridge 120 from the shelf system 115 to a position ready to load the tape cartridge 120 into a tape drive 130A or 130B. Generically, a tape drive is denoted herein as element 130. A tape drive 130 is an embodiment of a data transfer device that is adapted to cooperate, or relate, with a portable data storage cartridge. Hence, if a data storage cartridge is a portable solid state device, a data transfer device will likely include a connector device that connects with the solid state device, thus, facilitating storage operations between a client 102 and the portable solid state device, for example. An example of a robotic transporter 124 is a robotic device that moves along a rail system via a belt device, a motorized rack and pinion arrangement, a lead screw arrangement, a motor with wheels, etc. The tape cartridge 120 can be loaded into or removed from a tape drive 130 via a picker device 122, for example. The cooperating relationship between a tape cartridge 120 and a tape drive 130 is one that facilitates data storage operations, such as reading and writing data to and from the cooperating tape cartridge 120. In an optional embodiment, the tape cartridges 120 may be associated with different users of data, which can occur when the storage resources in the library 100 are divided into two or more partitions wherein each partition is associated with the different user of data, for example. The position ready to transfer the tape cartridge 120 into a tape drive is a location that facilitates a tape cartridge 120 to be inserted in one of the drives 130A or 130B, such as tape cartridge 120A shown in a cooperating relationship with the first tape drive 130. This is also a position that can facilitate the transfer of a tape cartridge 120 to a temporary repository location 112 just prior to loading the tape cartridge 120 in a tape drive 130.

The library 100 also optionally comprises an entry/exit port 110 whereby tape cartridges 120 can be transferred between an environment external to the library 100 and an environment internal to the library 100. In this embodiment, the library 100 provides a graphical user interface 132 and an auxiliary memory 134, such as one or more disk drives, solid state memory or other non-volatile memory device/s capable of retaining (storing) relevant information, such as mapping address information of each tape cartridge 120, for example. The library 100 further possesses a computer or Central Processing Unit (CPU) 136 that actively cooperates with algorithms to orchestrate actions to components within the library 100, for example, over a Computer Area Network (CAN), not shown. The library 100 possesses a controller/map system 108, which can optionally be functionally included with the CPU 136. The controller/map system 108 maintains the addresses of the components mapped out for the client 102 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1, such as additional controllers (such as those controlling other components in the library including the robotic transporter 124), wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 108 can provide the information directly to the client 102. An inquiry can be a client 102 effectively asking the storage system 100 "who are you?" and "what are you?" The storage system 100 can be displayed showing a plurality of tape cartridges 100 located at specified slot addresses in the shelf system 115 and showing that there are two tape drives 130A and 130B at designated addresses and a transporter 124 and/or picker device 122 at designated addresses that are able to receive instructions from the client 102, for example.

Also illustratively shown in FIG. 1 are transitional repositories 112 located in close proximity to the tape drives, 130. As will be discussed below in more detail, the transitional repositories 112 are adapted to temporarily hold tape cartridges 120 while the picker device 122 swaps out tape cartridges 120 between uses in a tape drive 130. In an exemplary embodiment, a transitional repository 112 can be located nearby a tape drive 130, such as immediately above or under a tape drive 130. In an optional embodiment, a transitional repository 112 can be located within preferably forty-eight inches, more preferably thirty-six inches, more preferably twenty-four inches, and even more preferably twelve inches from a tape drive 130. In yet another optional embodiment, a plurality of tape drives 130A, 130B may each be associated with a transitional repository 112A and 112C, for example, or optionally, each of the plurality of drives 130A, 130B may share a single repository 112 or a single repository location adapted to accommodate a number of tape cartridges 120. As appreciated herein, the transitional repository 120 is a temporary repository that is independent of the shelf system 120, which is adapted to archive the tape cartridges 210 in the library 100. In one embodiment, the client 102 identifies the tape cartridges 120 in the shelf system 115 via addresses associated with each slot comprising the shelf system 115, however, in this embodiment, the client 102 does not have knowledge or, optionally, does not "see" the temporary repository 112 because the temporary repository 112 does not have an address identifiable by the client 102. In an optional embodiment, the client 102 can identify the temporary repository 112 via one or more associated addresses.

Figure 2:
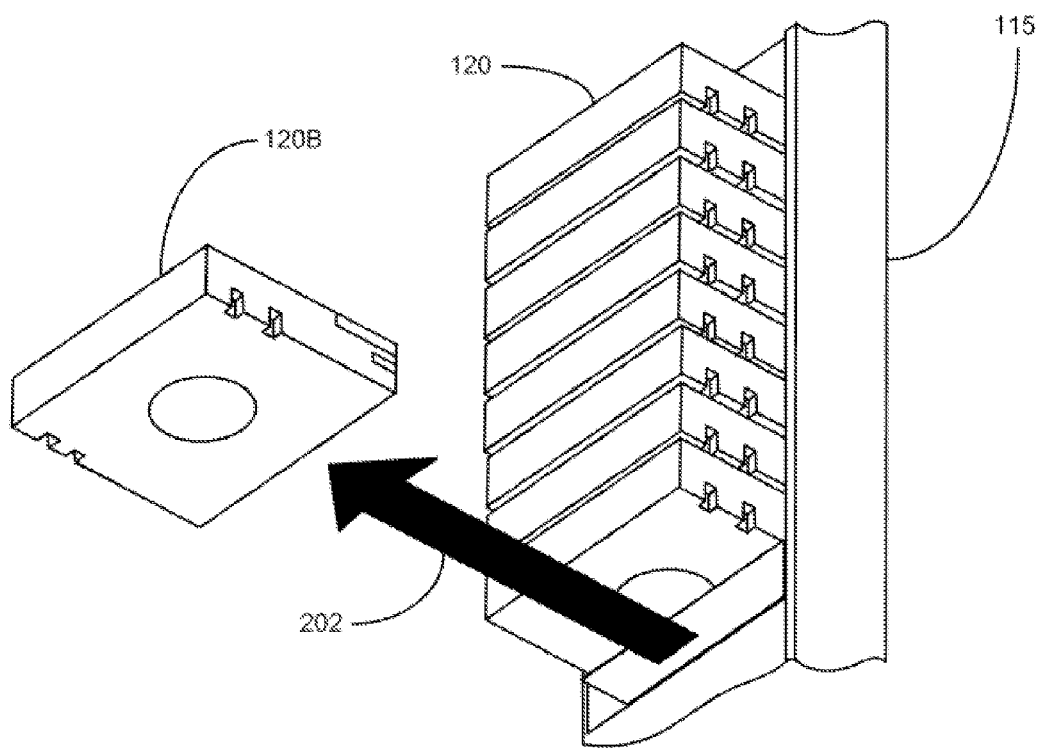
FIG. 2 shows a perspective illustration of a tape cartridge shelf system constructed in accordance with certain embodiments of the present invention.

With reference to FIG. 2, shown therein are tape cartridges 120 supported by a section of the shelf system 115. In more detail, a tape cartridge 120, such as an LTO-3 category tape cartridge, comprises magnetic tape that is capable of storing digital data written by a compatible tape drive 130, such as an LTO-3 tape drive, manufactured by IBM of Armonk, N.Y., when forming a cooperating relationship to read and write data (i.e. loaded) with the tape cartridge 120 as shown in FIG. 1. More specifically, a tape cartridge 120 is loaded in a tape drive 130 by being introduced to the tape drive 130 via an opening in the tape drive 130 whereby the tape drive 130 automatically draws the tape cartridge 120 therein to form the relationship that facilitates reading and writing data to the tape medium (not shown) disposed in the tape cartridge 120. The shelf system 115 is shown populated with a plurality of tape cartridges 120. A tape cartridge 120, in this case, a second tape cartridge 120B (used in the discussion later) can be removed from the shelf system 115, as shown by the arrow 202, by means of a picker device 122, shown in FIG. 1. In some embodiments, the tape cartridges 120 contain a Medium Auxiliary Memory (MAM) device (not shown), however, in alternative embodiments, some tape cartridges may not contain a MAM device. One example of a MAM device is a flash memory device that is activated by radio frequency. The auxiliary memory device can receive information that is maintained on the tape cartridge MAM devices contained via one or more MAM device readers/writers associated with a tape drive 130, or an alternative MAM reader device separate from a tape drive 130, for example. Information from each MAM device can be stored on the auxiliary storage device 134, for example.

A MAM device, in one embodiment, is parceled into three regions in which data can be stored: a medium device region which contains information such as a serial number (or some information corresponding to a tape's bar code, for example), a device region which can contain information from the tape drive such as load count, and host/vendor unique region wherein information such as history and/or performance data related to the cartridge 120 can be stored. The information in the regions can be supplemented to with new information via an address related to the arrangement of available storage space in the cartridge MAM device or, optionally, the information can be read by an auxiliary memory reader, such as a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 156, and the host/vendor unique region can be purged and made available for new information. In another example, the host/vendor data can be compressed in the MAM, or elsewhere, whereby the library 100 can be arranged to decompress the compressed host/vendor data, for example.

Figure 3A:
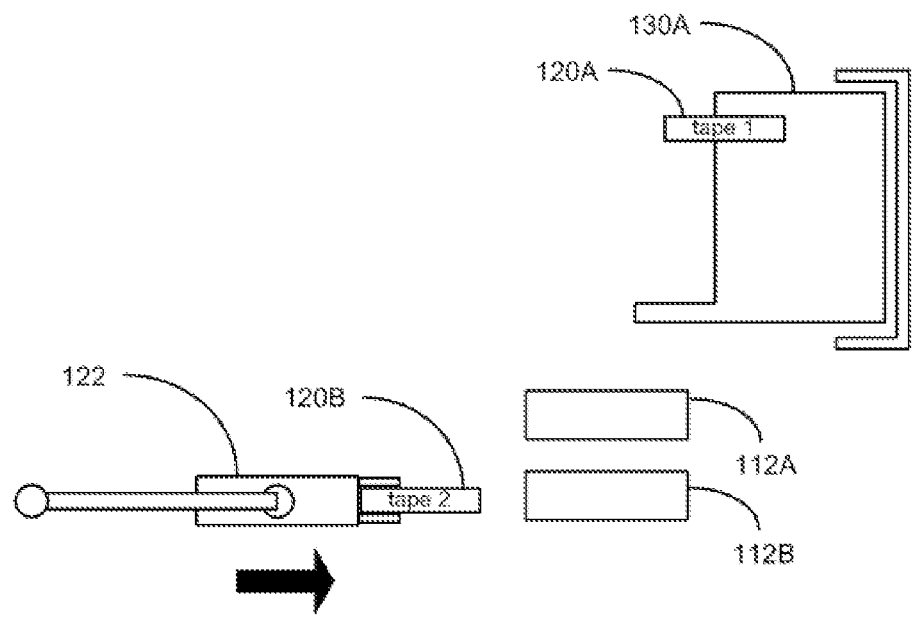
FIGS. 3A-3F are illustrations of a transporter and picker device cooperating with a repository system constructed in accordance with an embodiment of the present invention.
Figure 3B:
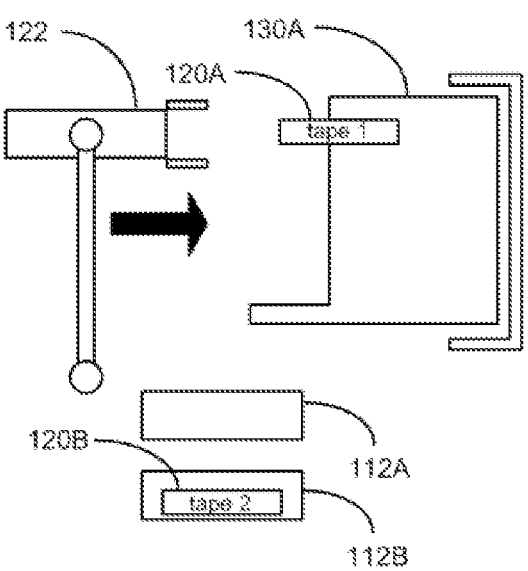
Figure 3C:
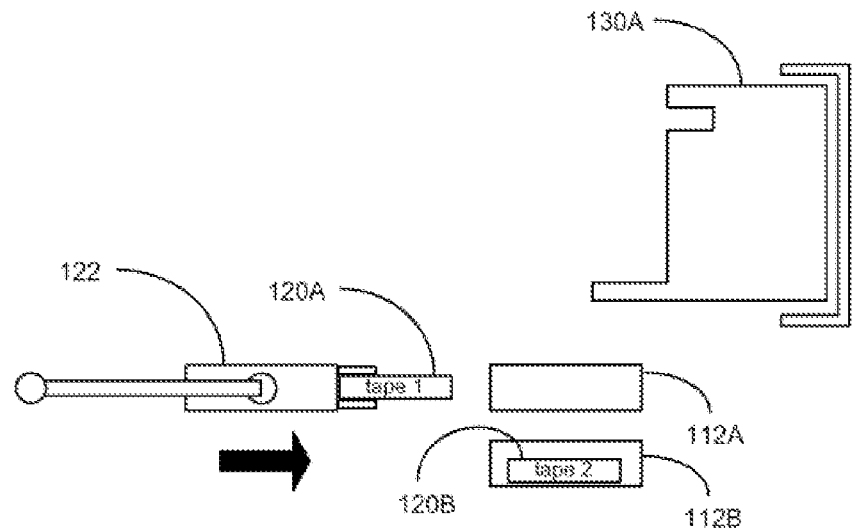
Figure 3D:
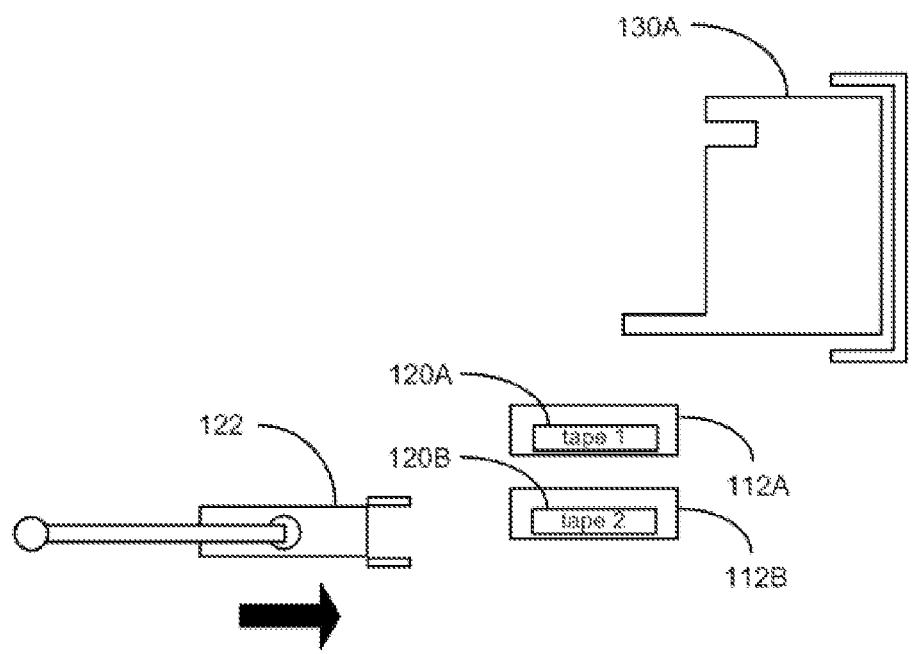
Figure 3E:
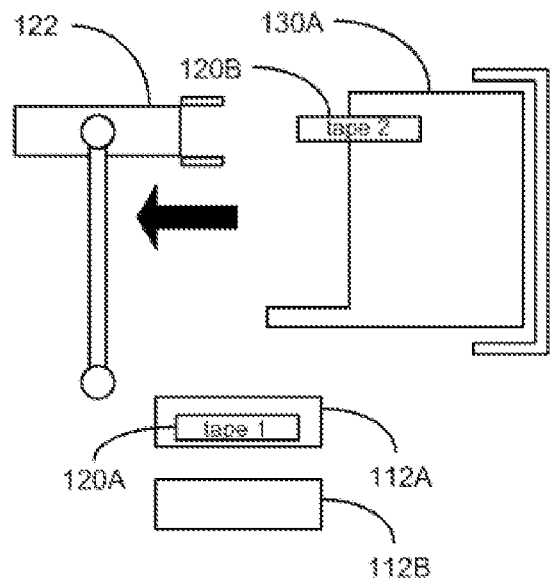
Figure 3F:
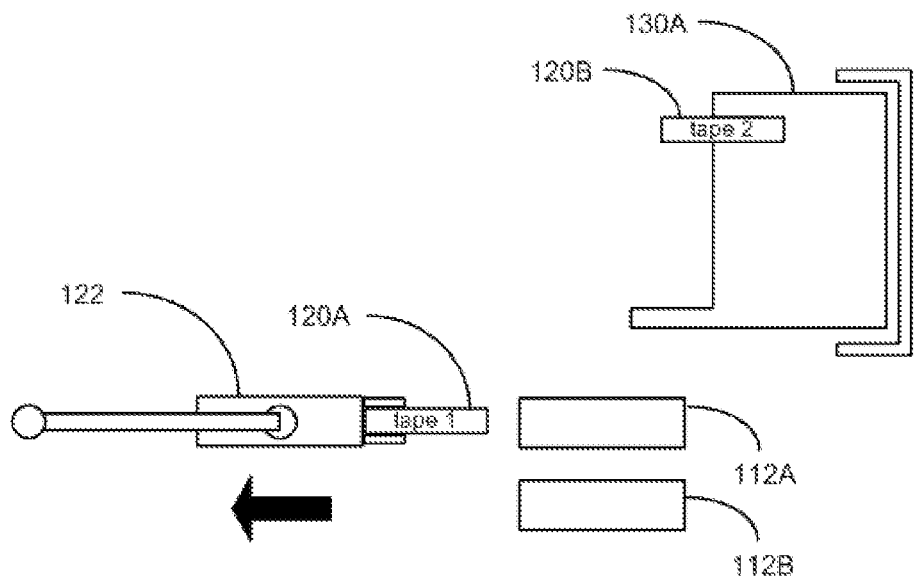
Figure 4:
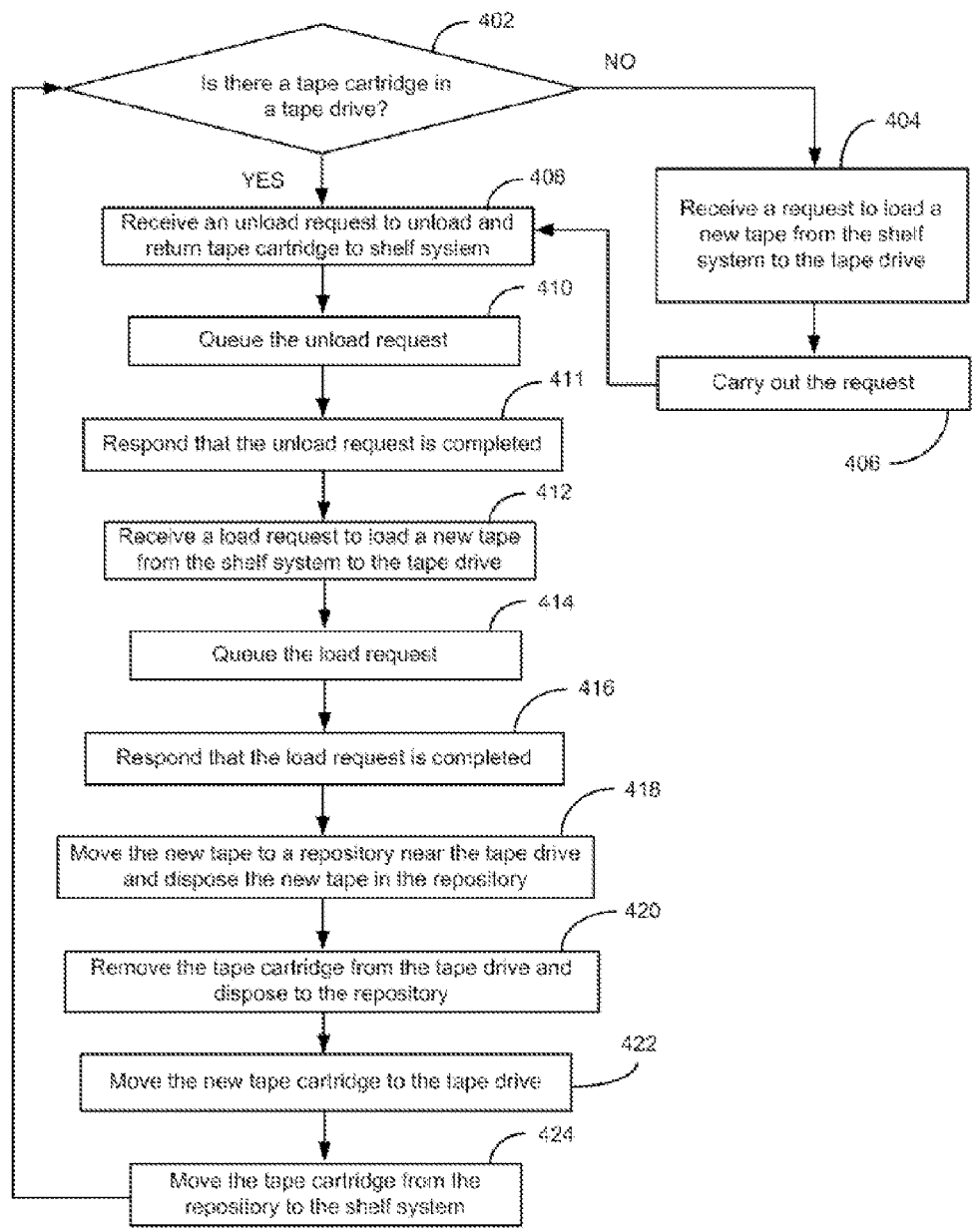
FIG. 4 is a block diagram of a method consistent with certain embodiments of the present invention.

FIG. 4 illustrates an embodiment of a method for efficiently moving tape cartridges 120 within a storage library 100 by essentially swapping a second tape cartridge 120B with a first tape cartridge 120A in relation to commonly using a tape drive 130A. FIG. 4 is described in conjunction with FIGS. 3A-3F and FIG. 1. It should be recognized that the steps presented in the described embodiments of the present invention do not necessarily require any particular sequence unless otherwise stated. With reference to step 402 in conjunction with FIG. 1, the library 100 is generally provided with a first tape drive 130A and a second tape drive 130B, a temporary tape cartridge repository location 112, a robotic transporter 124 with a picker device 122, and a plurality of tape cartridges 120 disposed in the shelf system 115. A client 102 queries the library 100 to determine the library's configuration. As shown by the diamond 404, if there is a tape cartridge 120 present in a target tape drive 130A, then proceed to step 410, otherwise proceed to step 406. Step 406 is a block showing the receipt of a request to move a first tape cartridge 120A from the shelf system 115 and load it in the tape drive 130A. The load request is simplified herein for ease of illustration, however, in actuality, there is a sequence of instructions that occurs, including identifying and moving the first tape cartridge 120A from the shelf system 115 to loading the first tape cartridge 120A in an engaged, cooperating relationship with the tape drive 130A ready to perform read/write operations. Step 408 essentially carries out the request to move the first tape cartridge 120A from a shelf system 115 and load it in the tape drive 130A. When the first tape cartridge has completed all storage operations for the client 102, then proceed to step 410. Here, the library 100 receives an unload request, e.g., from the client 102, to unload the first tape cartridge 120A from the tape drive 130A and return the first tape cartridge 120A back to its associated slot address in the shelf system 115. As shown in block 412, the storage system 100 queues the unload request in a queue system, that in one embodiment is maintained by the library CPU 136 and memory associated therewith. In an optional embodiment, the queue system can comprise a processor and memory, independent from the library CPU 136, adapted to perform the queuing steps discussed herein. As shown in block 414, the library 100 can respond to the client 102 that the unload request is complete prior to actually carrying out the unload request. In certain storage systems, the client 102 will not issue any additional requests until the client 102 has confirmation that the present request (in this case the unload request) is completed. As shown in block 416, after receiving the "virtual" confirmation that the unload request was completed, the client 102 issues a second load request to the library 100 to move a second tape cartridge 120B from the shelf system 115 to the tape drive 130A and load the second tape cartridge 130B therein to commence storage operations. At this point, the library 100 can manipulate the unload and the second load requests in a more efficient, time-saving, sequence of moves. In an embodiment, as shown in step 418, the second load request can be queued with the unload request with a further, optional, response to the client 102 that the second load request is completed, step 420, in order to alter the moves between the tape drive 130A and the repository 112, as will now be discussed.

With reference to FIG. 3A and continued reference to FIG. 4, because the first depicted tape cartridge 120A is still in the tape drive 130A when the robotic transporter 124 brings the second depicted tape cartridge 120B to the tape drive 130A, the second tape cartridge 120B is disposed in the repository slot 112B to free up the picker device 122 to remove the first tape cartridge 120A from the tape drive 130A (shown by the arrow), step 422. As shown in FIG. 3B in conjunction with step 424, the picker device 122 grasps the first tape cartridge 120A and removes it from the tape drive 130A and then moves the first tape cartridge 120A to the repository slot 112A. As shown in FIG. 3C, the first tape cartridge 120A is disposed in the repository slot 112A. As shown in FIG. 3D, in conjunction with step 426, the second tape cartridge 120B is removed from the repository slot 112B. Note, both the first tape cartridge 120A and the second tape cartridge 120B are disposed in their respective repository slots 112A and 112B concurrently for a period of time (FIG. 3D). As shown in FIG. 3E, the second tape cartridge 120B is then moved to the tape drive 130A and inserted in the tape drive 130A. At this point, second tape cartridge 120B can be fully loaded in the tape drive 130A to perform storage operations for the client 102. Finally, as shown in FIG. 3F in conjunction with step 428, the first tape cartridge 120A is removed from the repository slot 112A via the picker device 122 and moved back to the shelf system 115 where the first tape cartridge 120A can be archived in a more permanent manner within the library 100. This process can essentially be repeated with each new request to unload a tape cartridge from a tape drive 130 and load a different tape cartridge in the tape drive 130, as shown by the flow diagram arrow going to step 410.

Figure 5:
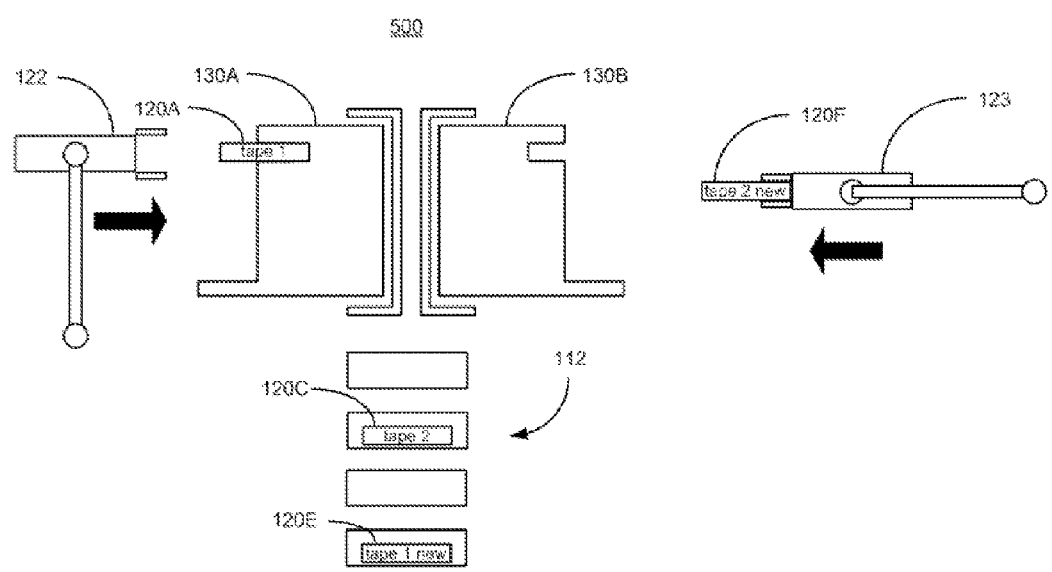
FIG. 5 is an illustration of a multi-robotic storage arrangement in accordance with certain embodiments of the present invention.

In certain embodiments, a tape cartridge library can possess multiple drives and multiple robotic transporters, each with an associated picker device, that cooperate with one another using the queuing system and temporary repository 112 to enhance efficiency with multiple moves and multiple move requests/commands. For example, as illustratively shown in FIG. 5, a tape library 500 possessing at least two tape drives 130A and 130B, each with a tape cartridge 120A and 120B, respectively, can receive a first unload command to return the first tape cartridge 120A back to a shelf system 115 and a second unload command to return the second tape cartridge 120B back to the shelf system 115. The first unload command can be queued for a first tape cartridge 120A and the second unload command can be queued for the second tape cartridge 120C. In some embodiments, the originator, such as a client 102, of the unload commands can be informed that each unload command is completed prior to actually carrying out the unload command in order to invoke the originator to send additional commands, such as the second unload command or new load commands, for example. After receiving a first and second load command to load new tapes 120E and 120F in the first and second tape drives 130A and 130B, respectively, a first robotic transporter and picker 122 can be directed, by the library 500, to move the first new tape cartridge 120E to the repository 112 and move the second tape cartridge 120C from the second tape drive 130B to the repository 112. The first robotic picker 122 can then be made to move the first tape cartridge 120A from the first tape drive 130A to the repository 112. While the first picker 122 is performing move operations on the first, second and first new tape cartridges 120A, 120C and 120E, the second robotic transporter and picker device 123 can be assigned to move the other new tape cartridge 120F to the second tape drive 130B, for example. This embodiment is exemplary of one strategic set of move operations executed via both picker devices 122 and 123. However, the library 500 can choose an efficient move operation by way of evaluating multiple possible move combinations that could be implemented via the picker devices 122 and 123 based on tape cartridge location, robotic transporter location and other possible factors, for example.

It will be appreciated that conventionally the robotic transporter 124 moves to the tape drive and picks up a tape cartridge, moves that tape cartridge to the shelf system 115, moves elsewhere in the shelf system to pick up a new tape cartridge, and then moves that new tape cartridge to the tape disk drive. In accordance with certain embodiments of the present invention, the robotic transporter 124 moves to the shelf system to pick up the new tape, moves the new tape to the repository, moves at most a short distance to the tape drive and picks out the old tape cartridge, moves with the old tape cartridge at most a short distance to the repository and deposits the old tape cartridge in the repository, and then picks the new tape cartridge from the repository and moves with the new tape cartridge at most a short distance to the tape drive and inserts the new tape cartridge in the tape drive, then moves at most a short distance to the repository and picks up the old tape cartridge, and then moves with the old tape cartridge to the shelf system 115 and places the old tape cartridge in a shelf. Preferably the robotic transporter 124 does not move at all between the tape drive and the repository, and the picker 122 alone moves cartridges between the tape drive and the repository. As such, the certain embodiments of the present invention essentially require only two major movements of the robotic transporter 124: from the shelf system to the tape drive and from the repository back to the shelf system, whereas conventionally the robotic transporter 124 requires three major movements: from the shelf system to the tape drive, from the tape drive to the shelf system, and from the shelf system to the tape drive. The present invention reduces the travel of the robotic transporter 124, thereby improving time efficiency and reducing wear on the robotic transporter 124.

As mentioned above, preferably the robotic transporter 124 may remain stationary, and only the picker 122 moves when transporting tape cartridges between the tape drive and the repository and vice-versa. In other words, both the tape drive and the repository are within the range of the picker 122 when the robotic transporter 124 is in a stationary position near both the tape drive and the repository.

It will also be appreciated that the repository holds both the first tape cartridge and the second tape cartridge concurrently for a relatively short period of time. Preferably such time period is less than one minute, more preferably less than thirty seconds, and even more preferably less than five seconds.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple repository slots 112 can be used to support multiple tape cartridges 120 or, optionally, one repository slot 112 can be arranged to support multiple tape cartridges 120, for example, while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 100, communication can be received directly by addressable components, such as the first drive 130, via the interface device 106, for example, without departing from the scope and spirit of the present invention. Further, for purposes of illustration, a first and second tape drive and first and second tape cartridges are used herein to simplify the description for a plurality of tape drives and tape cartridges. Additionally, as touched upon in conjunction with FIG. 5, multiple robotic transporters can work together with either a common or separate repository 112 to enhance move efficiency. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as solid state media adapted to be moved or other storage related "cartridges", without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage library arranged to perform a method comprising:
   receiving an unload request from a host computer to unload a first tape cartridge from a tape drive and return the first tape cartridge, via a return request, to a designated location in a shelf system;
   responding to the host computer that the unload request and the return request are complete, even though the unload request and the return request have not been physically carried out;
   receiving a load request from the host computer to load a second tape cartridge in the tape drive after receiving the unload request;
   transporting the second tape cartridge from the shelf system to a repository near the tape drive and disposing the second tape cartridge in the repository;
   removing the first tape cartridge from the tape drive and disposing the first tape cartridge in the repository after disposing the second tape cartridge in the repository;
   removing the second tape cartridge from the repository after disposing the first tape cartridge in the repository;
   loading the second tape cartridge in the tape drive; and
   removing the first tape cartridge from the repository and transporting the first tape cartridge back to the shelf system after loading the second tape cartridge.

2. The method of claim 1 further comprising executing the load and the unload requests via a library interface, memory device, a processing device, a controller, a robotic transporter and a picker device.

3. The method of claim 1 wherein the repository comprises at least two separate slots to accommodate each of said first and said second tape cartridge.

4. The method of claim 1 wherein the repository does not have an address recognizable to the host computer.

5. The method of claim 1 wherein the repository is not part of the shelf system.

6. A storage library arranged to perform a method comprising:
   unloading a first tape cartridge from a tape drive;
   disposing the first tape cartridge in a transitional repository located in close proximity to the tape drive;
   loading a second tape cartridge in the tape drive from the transitional repository wherein the first tape cartridge and the second tape cartridge are both located in the transitional repository at the same time; and
   moving the first tape cartridge to a shelf system from the transitional repository, the repository is not part of the shelf system.

7. The method of claim 6 further comprising:
   receiving a first request from a host to unload the first tape cartridge from the tape drive and return to the first tape cartridge back to the shelf;
   responding to the host that the first request is complete prior to completing the first request;
   maintaining the first request in storage.

8. The method of claim 6 further comprises moving the second tape cartridge from the shelf system to the transitional repository and disposing the second tape cartridge therein prior to disposing the first tape cartridge in the transitional repository.

9. The method of claim 6 further comprising moving the first tape cartridge from the tape drive to the transitional repository while the second tape cartridge is disposed in the transitional repository.

10. The method of claim 6 wherein the unloading step occurs before the disposing step, and the disposing step occurs before the loading step.

11. The method of claim 6 wherein the transitional repository is adapted to accommodate both the first and the second cartridges.

12. The method of claim 6 wherein the method further comprises performing storage operations with the second tape cartridge after being loaded in the tape drive.

13. The method of claim 6 wherein the moving step is accomplished with a robotic transporter that is controlled via a controller, the controller receives instructions from a processor, the instructions are maintained in a storage device, all of which are comprised by the storage library.

14. The method of claim 6 wherein the first tape cartridge is disposed in the transitional repository via a cartridge picking device.

15. The method of claim 6 wherein the transitional repository location is within twelve inches of the tape drive.

16. The method of claim 6 wherein the transitional repository location is essentially in-line with the tape drive, above and/or below.

17. The method of claim 6 wherein the shelf system possesses addresses that are made known to a host computer but the transitional repository does not have an address that is made known to the host computer.

18. A method comprising:
   providing a tape library possessing a shelf system, a first and a second tape cartridge, a tape drive, a picker device, a repository that is not part of the shelf system, the tape library connected to a host computer;
   receiving an unload request from the host computer to unload the first tape cartridge from the tape drive and a return request to return the first tape cartridge to a designated address location in the shelf system;
   responding to the host computer that the unload request and the return request are complete, even though the unload request and the return request have not been physically carried out;
   receiving a load request from the host computer to load the second tape cartridge in the tape drive after receiving the unload request;
   transporting the second tape cartridge from the shelf system to the repository;
   disposing the second tape cartridge in the repository;
   removing the first tape cartridge from the tape drive and disposing the first tape cartridge in the repository, wherein the first tape cartridge and the second tape cartridge are both located in the repository at the same time;
   removing the second tape cartridge from the repository then loading the second tape cartridge in the tape drive; and
   removing the first tape cartridge from the repository and transporting the first tape cartridge back to the shelf system after loading the second tape cartridge.

19. The method of claim 18 wherein the steps for removing the first tape cartridge from the tape drive and disposing the first tape cartridge in the repository are accomplished after disposing the second tape cartridge in the repository.

20. The method of claim 18 wherein both the unload request and the load requests are queued in a storage system in the library.

* * * * *